Patented Dec. 16, 1941

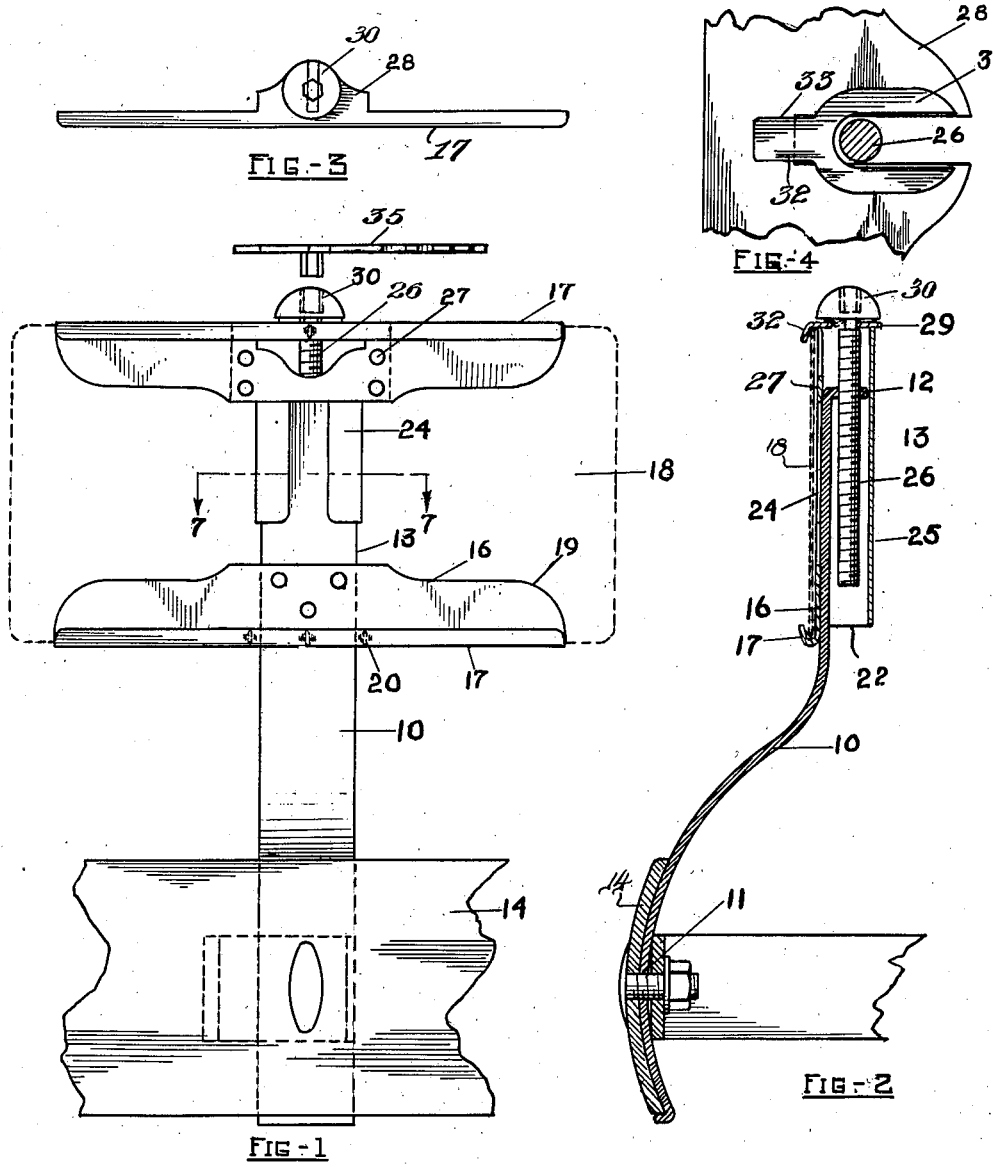

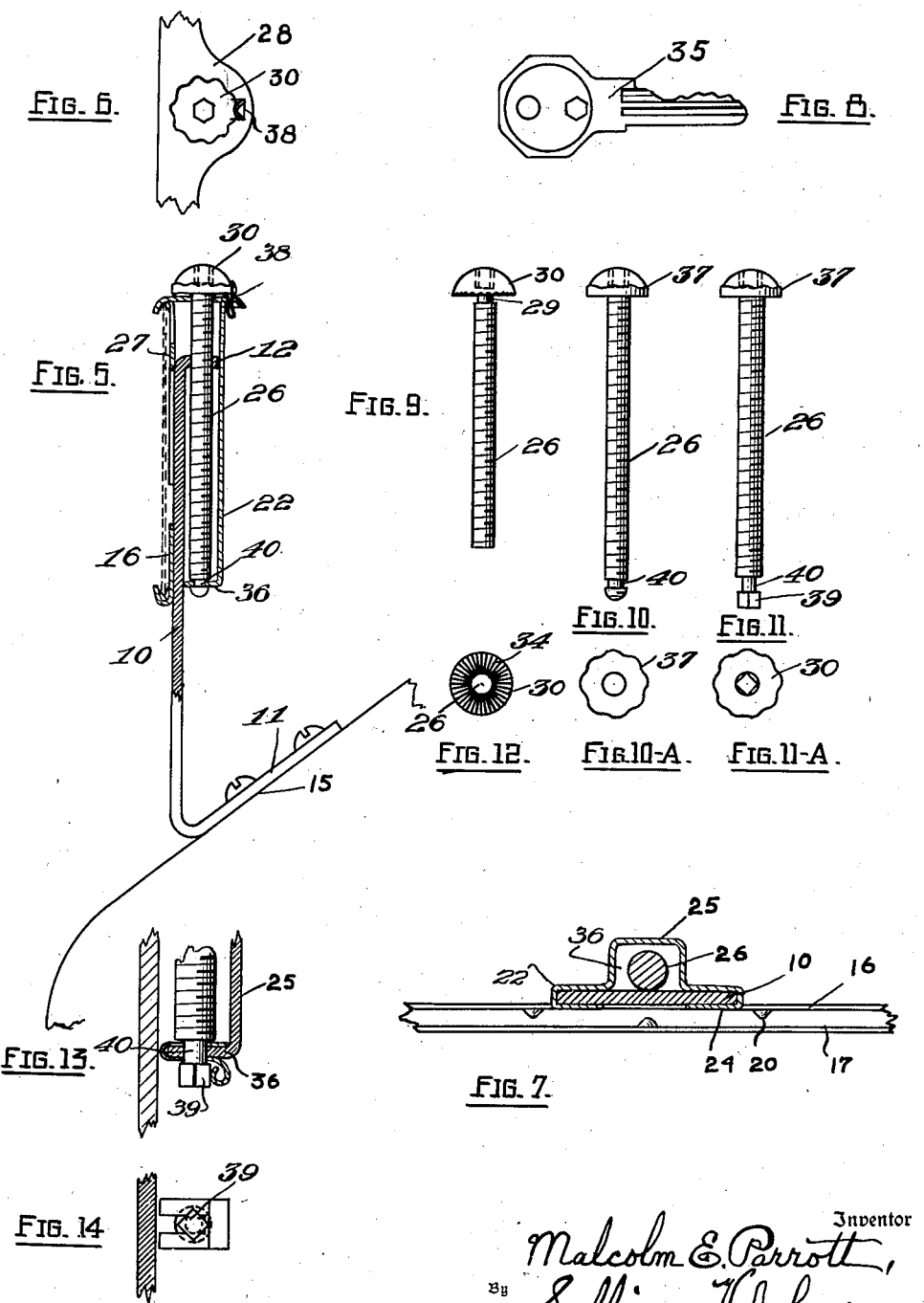

2,266,715

UNITED STATES PATENT OFFICE 2,266,715

ADJUSTABLE LICENSE PLATE HOLDER

Malcolm E. Parrott, Kingston, N. Y.

Application December 27, 1939, Serial No. 311,195

1 Claim. (Cl. 248—316)

The present invention is directed to improvements in brackets for supporting automobile license plates.

The license or registration plates required by all States to be prominently located on all automobiles, are not a standard width or length but vary from a short stubby plate, to a long narrow one, thus requiring a license bracket which will fit any one of these plates. The brackets in use on the present day automobiles are so large for the small plates that they are very unsightful, as the bracket extends beyond the ends of the license plate, giving a cheap appearance to any car regardless of the cost of the automobile.

The law requires new registration plates yearly which means the old plates must be removed from the bracket and replaced with the new registration plates. This operation often means hard work and the use of numerous tools, and in some cases ending in the the employment of a chisel to remove the rusted bolts and nuts fastening the plates to the brackets, and then requiring the procuring of new bolts and nuts to secure the new plates to the brackets.

The primary object of the invention is to provide an article of this kind, so constructed as to be adjustable to various size license plates.

Another object of the invention is to provide an article of this character which will hold the license plate firmly top and bottom eliminating the possibility of loss and the noise of rattles.

Another object of the invention is to provide a license plate holder to clamp and hold the plate by the use of a special key as a protection against theft of the plates.

Still another object of the invention is to provide an article of this character, so constructed that in the removal of a license plate therefrom, and the substitution of another plate, the use of tools is eliminated.

A further object of the invention is to provide an article of this character to afford quick and easy operation and present a trim and finished appearance to the surface of the plate when so mounted.

With these and other objects in view, the invention consists in certain novel construction and combination of parts as will hereinafter be fully described and claimed and further illustrated in the accompanying drawings which form a part hereof, and in which like figures of reference refer to corresponding parts in all of the views, and it is understood that slight changes may be made without departing from the spirit of the invention.

In the drawings:

Figure 1 shows a front view of the device attached to the front bumper of an automobile.

Figure 2 shows a side view of the same, sectioned on the center line of the device.

Figure 3 shows the top of the device.

Figure 4 shows an enlarged view of the top plate with the bolt head removed and the locking spring in place.

Figure 5 is a sectional view of the device as used on the back of an automobile.

Figure 6 is a section of the top showing the spring locking means.

Figure 7 is a section of the device taken along the line 7—7 of Figure 1.

Figure 8 shows the wrench secured to an ignition key.

Figure 9 shows the bolt as used in Figure 1.

Figure 10 is the bolt used in Figure 5.

Figure 11 shows a bolt with the locking means on the opposite end.

Figures 10—A and 11—A are bottom views of Figures 10 and 11 respectively.

Figure 12 is a bottom view of the bolt in Figure 9, showing the knurling.

Figure 13 is a section showing the locking means on the lower end of the bolt.

Figure 14 is a bottom view of the same.

Referring to the drawings:

The adjustable license plate holder embodying the invention is composed of a main support bracket 10, which is mounted directly on a car at one end, 11, and formed with a tab 12 bent at right angles to the bar 10, and in the center of the opposite end 13. I have shown the bar or bracket 10 mounted on the front bumper 14 with the end 11 bent to conform with the bumper, and I have shown it mounted on the back of the automobile with the end 11 bent to conform with the back deck of a car 15.

Secured to this bracket 10, near its upper end, by riveting, welding or some other suitable means is the lower or stationary clamping plate 16, formed from a strip of metal with one long edge overturned 17 to receive the edge of the license plate 18, and the opposite edge 19 formed with receding corners to make a pleasing design. The overturned edge 17 is scored, indented, knurled, or in some suitable manner roughened or shaped 20 to prevent lengthwise movement of the license plate 18.

To carry the adjustable part of the license plate holder, a slide or telescoping member 22 is formed from a metal blank with the edges 24 bent over to form a guide for the brace 10, and the center of the back 25 bent to form a protection for the bolt 26. Adjacent the top of the slide 22 the edge is bent back to form a support for the upper or moving clamping plate 27.

The upper clamping plate 27 is formed in the same manner as the lower plate 16, with the overturned edge 17, but in addition a center section 28, adjacent the edge 17, is bent at right angles to the plate 27 to form a cover to the back section 25 of the slide 22. To the slide 22 the plate 27 is secured by welding, riveting or other suitable means, thus becoming a sliding or movable clamping means. The two plates 16, 27, are secured in relation to each other so the open edges 17 face each other to receive and clamp a license plate 18 between them.

To provide this clamping or adjusting movement, the section 28 of the plate 27 is slotted 33 to receive the grooved part 29 of the bolt 26 adjacent its head 30, and the tab 12 of the bar 10 is threaded to coact with the bolt 26 to raise or lower the slide 22 as the bolt is screwed or unscrewed.

To lock the device in any position a spring 31 is placed under the head 30 of the bolt 26 and prevented from moving with the bolt by the tip 32 of the spring 31 bent so as to drop into the slot 33 and then bear against a knurled or roughened section on the underneath side 34 of the head 30.

For turning the bolt 26 the head 30 is broached for an allen wrench, or a hex hole is placed in the head, which I have shown secured to an automobile ignition key 35 by welding or some other suitable manner. The head of the bolt 26 is also made round to prevent the use of any tools but the special wrench to turn it as a protection against theft.

I have also shown in Figure 5 another method for raising and lowering the slide 22, by forming a tab 36 on the lower end of the slide. A slot is formed in this tab 36 to receive and act as a bearing for a groove 40 formed in the bolt 26 adjacent the lower end. I have also shown two more ways of providing locking means to the bolt 26, by knurling or scalloping the edge of rim 37 of the bolt head 30 to coact with a spring 38 protruding thru a slot 38 in the section 28, and the other by providing a squared end 39 to the bolt 26 adjacent the groove 40, and a clip spring to act against the flats of the squared end 39.

It will thus be seen that the license plate holder may be secured to a suitable support and that it is adjustable to hold license plates of varying sizes to display the same in an effective manner, as well as to permit the removal and substitution of other plates as desired. Furthermore it will be seen that the device tightly and securely displays a license plate without the use of any bolts or nuts and tools, but requires only the special wrench provided.

What I claim and desire to secure by United States Letters Patent, is—

An adjustable license plate holder comprising elongated bracket, means for attaching the bracket to the body of a motor vehicle, a slide telescopically engaged with the body of the bracket adjacent the free end thereof, an enlargement on the upper edge of the slide and having a slot therein, the bracket being bent to provide a tab disposed within the slide, a lower plate edge clamping member secured to the bracket, an upper plate edge clamping member secured to the slide, and a bolt threadedly engaged with the tab and swivelly engaged in the slot of the enlargement for adjustably moving the second clamping member toward and from the first clamping member and a spring carried by the slide and engaging the head of the bolt, said bolt having an annular groove therein for receiving the walls of the slot, whereby the slide is moved upon rotation of the bolt.

MALCOLM E. PARROTT.